US008200385B2

(12) United States Patent
Ando et al.

(10) Patent No.: US 8,200,385 B2
(45) Date of Patent: Jun. 12, 2012

(54) POWER OUTPUT APPARATUS, CONTROL METHOD THEREOF, AND VEHICLE

(75) Inventors: Daigo Ando, Nagoya (JP); Takeshi Harada, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 521 days.

(21) Appl. No.: 12/481,275

(22) Filed: Jun. 9, 2009

(65) Prior Publication Data

US 2009/0319109 A1 Dec. 24, 2009

(30) Foreign Application Priority Data

Jun. 18, 2008 (JP) .................................. 2008-159365

(51) Int. Cl.
*G06F 19/00* (2011.01)
*F02D 45/00* (2006.01)
(52) U.S. Cl. .................. 701/22; 180/65.28; 180/65.265; 903/903; 903/916
(58) Field of Classification Search ....................... 701/22
See application file for complete search history.

(56) References Cited

U.S. PATENT DOCUMENTS

| 5,249,558 | A * | 10/1993 | Imamura ..................... 123/339.2 |
| 5,929,608 | A * | 7/1999 | Ibaraki et al. .................. 322/16 |
| 7,657,362 | B2 * | 2/2010 | Ando et al. .................... 701/106 |
| 2011/0004364 | A1 * | 1/2011 | Sawada et al. ................. 701/22 |

FOREIGN PATENT DOCUMENTS

| JP | 09032607 | | 2/1997 |
| JP | 2000-097069 | A | 4/2000 |
| JP | 2001020788 | | 1/2001 |
| JP | 2006-063824 | A | 3/2006 |
| JP | 2006-322412 | A | 11/2006 |
| JP | 2007-196889 | A | 8/2007 |
| WO | 2005085616 | A1 | 9/2005 |

OTHER PUBLICATIONS

Office Action issued Mar. 27, 2012 in Japanese Patent Application No. 2006-159365 and English language translation thereof.

\* cited by examiner

*Primary Examiner* — Thomas Black
*Assistant Examiner* — Lin B Olsen
(74) *Attorney, Agent, or Firm* — Gifford, Krass, Sprinkle, Anderson & Citkowski, P.C.

(57) ABSTRACT

A power output apparatus includes a control unit that controls an internal combustion engine, a generator, and an electric motor such that a required driving force is output to a drive shaft. The control unit learns an idle control amount, which is a control amount obtained during an idle operation of the internal combustion engine, in accordance with establishment of a predetermined learning condition when a rotation variation amount of the drive shaft is within a predetermined range including a value of zero, and does not learn the idle control amount when the rotation variation amount of the drive shaft is not within the predetermined range.

11 Claims, 5 Drawing Sheets

POWER OUTPUT APPARATUS, CONTROL METHOD THEREOF, AND VEHICLE

INCORPORATION BY REFERENCE

The disclosure of Japanese Patent Application No. 2008-159365, filed on Jun. 18, 2008 including the specification, drawings and abstract, is incorporated herein by reference in its entirety.

BACKGROUND OF THE INVENTION

1. Field of the Invention

The invention relates to a power output apparatus, a control method thereof, and a vehicle equipped with the power output apparatus.

2. Description of the Related Art

For example, Japanese Patent Application Publication No. 2001-20788 (JP-A-2001-20788) describes a power output apparatus installed in a vehicle, which, under a predetermined deceleration condition, prohibits learning of a control amount obtained during an idle operation of an engine. In this apparatus, unpleasant vibration and engine stalling are prevented by prohibiting learning of an idle control amount and reduction correction of a bypass intake air amount via an ISC valve upon establishment of a deceleration condition in which a difference between an engine speed that has decreased due to a fuel cut and a target idle rotation speed is greater than a predetermined value.

In a power output apparatus in which a drive shaft, an output shaft of an engine, and a rotary shaft of a generator are connected by a planetary gear mechanism or the like, and which is capable of outputting power to the drive shaft using only power from an electric motor connected to the drive shaft, an idle control amount may be learned by causing the engine to perform an idle operation while power is output to the drive shaft using only power from the electric motor. However, during deceleration or the like, i.e. when the rotation speed of the drive shaft varies, this rotation variation in the drive shaft affects the output shaft of the engine, and as a result, the idle control amount may be learned erroneously.

SUMMARY OF THE INVENTION

The invention provides a power output apparatus, a control method thereof, and a vehicle, with which a control amount during an idle operation of an internal combustion engine can be learned more appropriately.

A first aspect of the invention provides a power output apparatus including: an internal combustion engine; a generator for inputting and outputting power; a triaxial power input/output unit that is mechanically connected to three shafts, including a drive shaft, an output shaft of the internal combustion engine, and a rotary shaft of the generator, in order to output power input into any two of the three shafts into a remaining shaft of the three shafts and output power input into any one of the three shafts into two remaining shafts of the three shafts; an electric motor for inputting and outputting power to and from the drive shaft; a storage unit that exchanges power with the generator and the electric motor; and a required driving force setting unit that sets a required driving force required by the drive shaft. The power output apparatus also includes a control unit that controls the internal combustion engine, the generator, and the electric motor such that the set required driving force is output to the drive shaft. When a rotation variation amount of the drive shaft is within a predetermined range including a value of zero, the control unit learns an idle control amount, which is a control amount obtained during an idle operation of the internal combustion engine, in accordance with establishment of a predetermined learning condition, and when the rotation variation amount of the drive shaft is not within the predetermined range, the control unit does not learn the idle control amount.

In the power output apparatus according to the first aspect of the invention, when the rotation variation amount of the drive shaft is within a predetermined range including a value of zero, the idle control amount, which is a control amount obtained during an idle operation of the internal combustion engine, is learned in accordance with establishment of a predetermined learning condition, and the internal combustion engine, the generator, and the electric motor are controlled such that the required driving force required by the drive shaft is output to the drive shaft. Hence, the idle control amount can be learned when the rotation variation amount of the drive shaft is comparatively small. Further, when the rotation variation amount of the drive shaft is not within the predetermined range, the internal combustion engine, the generator, and the electric motor are controlled to output the required driving force to the drive shaft without learning the idle control amount. When the rotation variation amount of the drive shaft is comparatively large, the power that is output to the output shaft of the internal combustion engine increases in accordance with the rotation variation amount of the drive shaft. However, the idle control amount is not learned when this increased power is output to the output shaft of the internal combustion engine, and therefore erroneous learning of the idle control amount is suppressed. As a result, the idle control amount can be learned more appropriately.

A second aspect of the invention provides a vehicle having an axle that is connected to a drive shaft and installed with the power output apparatus described above, or more specifically a power output apparatus including: an internal combustion engine; a generator for inputting and outputting power; a triaxial power input/output unit that is mechanically connected to three shafts, including the drive shaft, an output shaft of the internal combustion engine, and a rotary shaft of the generator, in order to output power input into any two of the three shafts into a remaining shaft of the three shafts and output power input into any one of the three shafts into two remaining shafts of the three shafts; an electric motor for inputting and outputting power to and from the drive shaft; a storage unit that exchanges power with the generator and the electric motor; a required driving force setting unit that sets a required driving force required by the drive shaft; and a control unit that controls the internal combustion engine, the generator, and the electric motor such that the set required driving force is output to the drive shaft, wherein, when a rotation variation amount of the drive shaft is within a predetermined range including a value of zero, the control unit learns an idle control amount, which is a control amount obtained during an idle operation of the internal combustion engine, in accordance with establishment of a predetermined learning condition, and when the rotation variation amount of the drive shaft is not within the predetermined range, the control unit does not learn the idle control amount.

The vehicle according to the second aspect of the invention is equipped with the power output apparatus according to the first aspect of the invention, and is therefore capable of exhibiting similar effects to the effects of the power output apparatus according to the first aspect, for example an effect whereby the idle control amount can be learned more appropriately by learning the idle control amount when the variation amount of the drive shaft is comparatively small and suppressing erroneous learning of the idle control amount when the variation amount of the drive shaft is comparatively large, and so on.

The invention may further include a generator inverter circuit that is electrically connected to the generator and the storage unit in order to drive the generator, and an electric motor inverter circuit that is electrically connected to the electric motor and the storage unit in order to drive the electric motor. The control unit may perform gate blocking on the generator inverter circuit and the electric motor inverter circuit and set a first range as the predetermined range when a shift position is a neutral position, and may set a second range, which is larger than the first range, as the predetermined range without performing gate blocking on the generator inverter circuit and the electric motor inverter circuit when the shift position is not the neutral position. When the shift position is the neutral position, the power that is output to the output shaft of the internal combustion engine increases in comparison with the power in other shift positions due to a counter-electromotive force generated by the generator and the electric motor upon gate-blocking of the inverter circuits during travel. Therefore, when the shift position is the neutral position, the idle control amount is learned in a narrower drive shaft rotation variation amount range than when the shift position is not in the neutral position, and as a result, the idle control amount can be learned even more appropriately.

Further, the control unit may use a variation amount of a vehicle speed as the rotation variation amount of the drive shaft, and may use a predetermined vehicle speed range including a value of zero as the predetermined range.

A third aspect of the invention provides a control method for a power output apparatus including an internal combustion engine, a generator for inputting and outputting power, a triaxial power input/output unit that is mechanically connected to three shafts, including a drive shaft, an output shaft of the internal combustion engine, and a rotary shaft of the generator, in order to output power input into any two of the three shafts into a remaining shaft of the three shafts and output power input into any one of the three shafts into two remaining shafts of the three shafts, an electric motor for inputting and outputting power to and from the drive shaft, and a storage unit that exchanges power with the generator and the electric motor. When a rotation variation amount of the drive shaft is within a predetermined range including a value of zero, an idle control amount, which is a control amount obtained during an idle operation of the internal combustion engine, is learned in accordance with establishment of a predetermined learning condition and the internal combustion engine, the generator, and the electric motor are controlled such that a required driving force required by the drive shaft is output to the drive shaft, and when the rotation variation amount of the drive shaft is not within the predetermined range, the internal combustion engine, the generator, and the electric motor are controlled such that the required driving force is output to the drive shaft without learning the idle control amount.

In the control method for a power output apparatus according to the third aspect of the invention, when the rotation variation amount of the drive shaft is within a predetermined range including a value of zero, the idle control amount, which is a control amount obtained during an idle operation of the internal combustion engine, is learned in accordance with establishment of a predetermined learning condition, and the internal combustion engine, the generator, and the electric motor are controlled such that the required driving force required by the drive shaft is output to the drive shaft. Hence, the idle control amount can be learned when the rotation variation amount of the drive shaft is comparatively small. Further, when the rotation variation amount of the drive shaft is not within the predetermined range, the internal combustion engine, the generator, and the electric motor are controlled to output the required driving force to the drive shaft without learning the idle control amount. When the rotation variation amount of the drive shaft is comparatively large, the power that is output to the output shaft of the internal combustion engine increases in accordance with the rotation variation amount of the drive shaft. However, the idle control amount is not learned when this increased power is output to the output shaft, and therefore erroneous learning of the idle control amount is suppressed. As a result, the idle control amount can be learned more appropriately.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
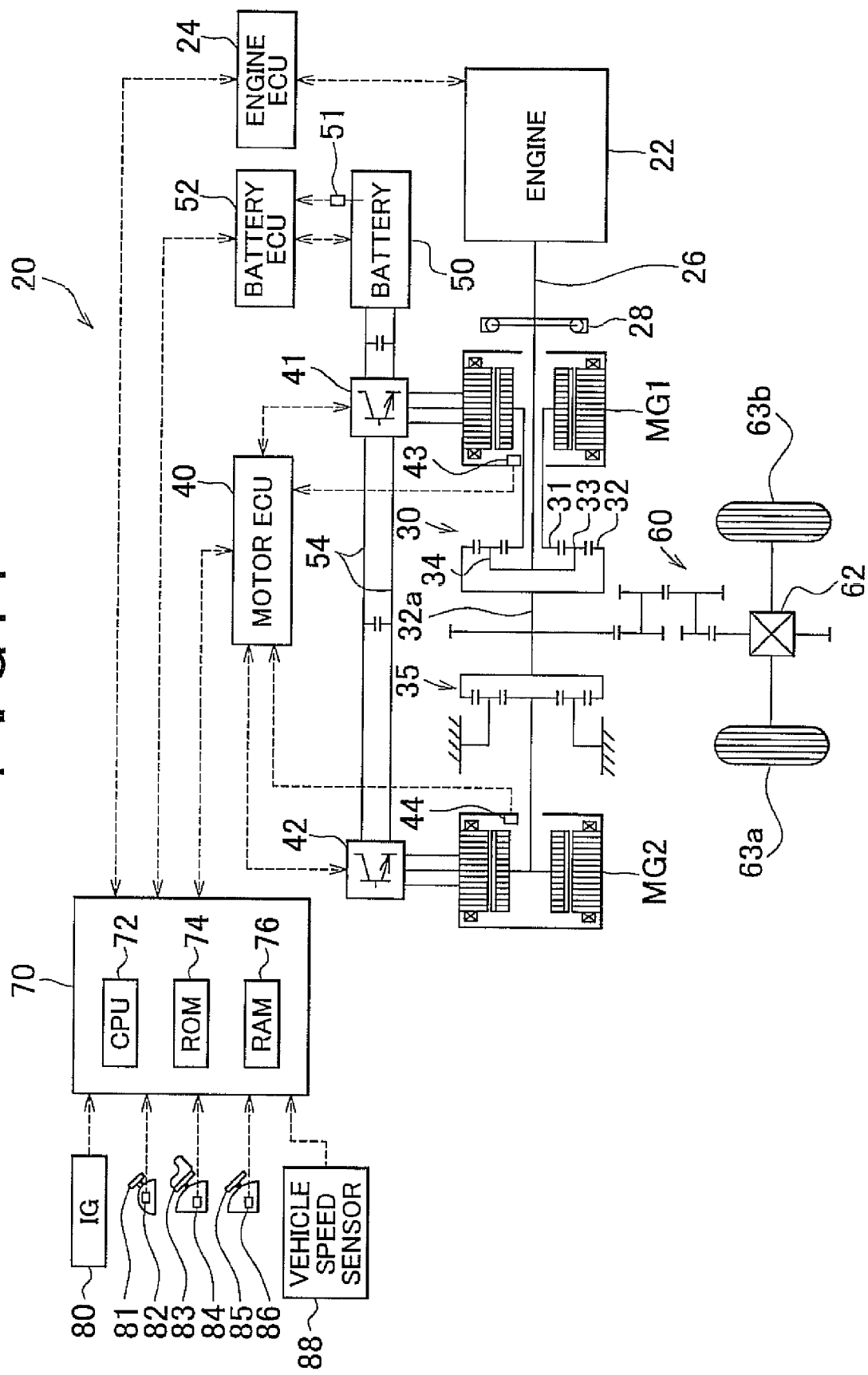
FIG. 1 is a schematic diagram showing the constitution of a hybrid automobile serving as an embodiment of the invention.

Next, an embodiment of the invention will be described. FIG. 1 is a schematic diagram showing the constitution of a hybrid automobile 20 equipped with a power output apparatus according to an embodiment of the invention. As shown in the drawing, the hybrid automobile 20 according to this embodiment includes an engine 22, a triaxial power distribution integration mechanism 30 connected to a crankshaft 26, which serves as an output shaft of the engine 22, via a damper 28, a motor MG1 that is connected to the power distribution integration mechanism 30 and is capable of generating power, a reduction gear 35 attached to a ring gear shaft 32a serving as a drive shaft connected to the power distribution integration mechanism 30, a motor MG2 connected to the reduction gear 35, and a hybrid electronic control unit 70 (to be referred to hereafter as a hybrid ECU) for controlling the entire power output apparatus.

The engine 22 is an internal combustion engine that outputs power using a hydrocarbon-based fuel such as gasoline or light oil. An engine electronic control unit (to be referred to hereafter as an engine ECU) 24 receives signals from various sensors for detecting operating conditions of the engine 22, and performs operation control, including fuel injection control, ignition control, intake air amount regulation control, and so on, on the engine 22. The signals from the various sensors include, for example, a cooling water temperature Tw from a water temperature sensor, not shown in the drawing, which detects the temperature of cooling water in the engine 22, a crank position from a crank position sensor, not shown in the drawing, which is attached to the crankshaft 26, and so on. When a predetermined learning condition is established, for example when the cooling water temperature Tw of the engine 22 has reached or exceeded a predetermined temperature (for example, 65° C., 70° C., or the like) indicating warm-up completion and an idle operation is underway in the engine 22, the engine ECU 24 feedback-controls a control amount such as a throttle opening such that a engine speed Ne of the engine 22 corresponds to an idle rotation speed Nidl (for example, 900 rpm, 1000 rpm, or the like), and thereby learns a control amount for operating the engine 22 at the idle rotation speed Nidl. The resulting learned value is then stored for use during subsequent idle operation control of the engine 22. The engine ECU 24 also stores information indicating whether or not learning of the idle operation control amount (to be referred to hereafter as an idle control amount) is complete. Further, the engine ECU 24 communicates with the hybrid ECU 70 in order to control the operations of the engine 22 in accordance with a control signal from the hybrid ECU 70 and, when necessary, output data relating to the operating conditions of the engine 22 to the hybrid ECU 70. Note that the engine ECU 24 also calculates a rotation speed of the crankshaft 26, or in other words the engine speed Ne of the engine 22, on the basis of a signal from the crank position sensor.

The power distribution integration mechanism 30 is a planetary gear mechanism including a sun gear 31 serving as an external gear, a ring gear 32 serving as an internal gear that is disposed concentrically with the sun gear 31, multiple pinion gears 33 that mesh with both the sun gear 31 and the ring gear 32, and a carrier 34 that holds the multiple pinion gears 33 to be free to rotate and revolve. The power distribution integration mechanism performs a differential action using the sun gear 31, the ring gear 32, and the carrier 34 as rotary elements. In the power distribution integration mechanism 30, the crankshaft 26 of the engine 22 is connected to the carrier 34, the motor MG1 is connected to the sun gear 31, and the reduction gear 35 is connected to the ring gear 32 via a ring gear shaft 32a. When functioning as a generator, the motor MG1 distributes power from the engine 22, which is input from the carrier 34, to the sun gear 31 side and the ring gear 32 side in accordance with a gear ratio between the sun gear 31 and the ring gear 32, and when functioning as an electric motor, the motor MG1 integrates the power of the engine 22 input from the carrier 34 and the power of the motor MG1, which is input from the sun gear 31, and outputs the integrated power to the ring gear 32 side. The power output to the ring gear 32 is ultimately output from the ring gear shaft 32a to drive wheels 63a, 63b of the vehicle via a gear mechanism 60 and a differential gear 62.

The motor MG1 and the motor MG2 are both well-known synchronous generator-motors that include a rotor having a permanent magnet adhered to an outer surface thereof and a stator around which a three-phase coil is wound, and can be driven as both a generator and an electric motor. The motors MG1, MG2 exchange power with the battery 50 via inverters 41, 42. A power line 54 connecting the inverters 41, 42 and the battery 50 serves as a positive electrode bus and a negative electrode bus shared by the inverters 41, 42 such that power generated by one of the motors MG1, MG2 can be consumed by the other. Accordingly, the battery 50 is charged using power generated by one of the motors MG1, MG2, and when a power deficiency occurs in the motors MG1, MG2, the motors MG1, MG2 extract power from the battery. Note that the battery 50 is neither charged nor discharged when an electric power balance is achieved by the motors MG1, MG2. The motors MG1, MG2 are both drive-controlled by a motor electronic control unit (to be referred to hereafter as a motor ECU) 40. The motor ECU 40 receives signals required to subject the motors MG1, MG2 to drive control, for example a signal from rotation position detection sensors 43, 44 that detect rotation positions of rotors in the motors MG1, MG2 and phase currents that are applied to the motors MG1, MG2 and detected by a current sensor, not shown in the drawing, and outputs a switching control signal to the inverters 41, 42. The motor ECU 40 communicates with the hybrid ECU 70 in order to drive-control the motors MG1, MG2 in accordance with a control signal from the hybrid ECU 70 and, when necessary, output data relating to the operating conditions of the motors MG1, MG2 to the hybrid ECU 70. Note that the motor ECU 40 also calculates rotation speeds Nm1, Nm2 of the motors MG1, MG2 on the basis of signals from the rotation position detection sensors 43, 44.

A battery electronic control unit (to be referred to hereafter as a battery ECU) 52 manages the battery 50. The battery ECU 52 receives signals required to manage the battery 50, for example an inter-terminal voltage obtained from a voltage sensor, not shown, disposed between terminals of the battery 50, a charge/discharge current obtained from a current sensor, not shown, attached to the power line 54, which is connected to an output terminal of the battery 50, a battery temperature Tb obtained from a temperature sensor 51 attached to the battery 50, and so on, and when necessary, outputs data relating to the condition of the battery 50 to the hybrid ECU 70 through communication. Further, to manage the battery 50, the battery ECU 52 calculates a remaining capacity (SOC; State of Charge) on the basis of an integrated value of the charge/discharge current detected by the current sensor, and calculates input/output limits Win, Wout, which serve as maximum allowable power values by which the battery 50 can be charged and discharged, on the basis of the calculated remaining capacity (SOC) and the battery temperature Tb. Note that the input/output limits Win, Wout of the battery 50 may be set by setting basic values of the input/output limits Win, Wout on the basis of the battery temperature Tb, setting an output limit correction coefficient and an input limit correction coefficient on the basis of the remaining capacity (SOC) of the battery 50, and multiplying the correction coefficients by the set basic values of the input/output limits Win, Wout.

The hybrid ECU 70 is a microprocessor centering on a Central Processing Unit (CPU) 72 and including, in addition to the CPU 72, a Read Only Memory (ROM) 74 for storing processing programs, a Random Access Memory (RAM) 76 for storing data temporarily, and an input/output port and a communication port, neither of which is shown in the drawing. The hybrid ECU 70 receives an ignition signal from an ignition switch 80, a shift position SP from a shift position sensor 82 for detecting an operating position of a shift lever 81, an accelerator depression amount Acc from an accelerator pedal position sensor 84 for detecting a depression amount of an accelerator pedal 83, a brake pedal position BP from a brake pedal position sensor 86 for detecting a depression amount of a brake pedal 85, a vehicle speed V from a vehicle speed sensor 88, and so on via the input port. As described above, the hybrid ECU 70 is connected to the engine ECU 24, the motor ECU 40, and the battery ECU 52 via the communication port in order to exchange various control signals and data with the engine ECU 24, the motor ECU 40, and the battery ECU 52. Note that in the hybrid automobile 20 according to this embodiment, the shift position SP includes a parking position (P position), a neutral position (N position), a drive position (D position), a reverse position (R position), and so on.

The hybrid automobile 20 according to this embodiment, constituted in the manner described above, calculates a required torque to be output to the ring gear shaft 32a on the basis of the accelerator depression amount Acc and the vehicle speed V corresponding to the amount by which the accelerator pedal 83 is depressed by a driver, and subjects the engine 22, the motor MG1, and the motor MG2 to operation control such that a required power corresponding to the required torque is output to the ring gear shaft 32a. The operation control performed on the engine 22, the motor MG1, and the motor MG2 includes a torque conversion operating mode, a charge/discharge operating mode, a motor operating mode, and so on. In the torque conversion operating mode, the engine 22 is operation-controlled such that the required power is output, and the motors MG1, MG2 are drive-controlled such that all of the power output from the engine 22 is subjected to torque conversion by the power distribution integration mechanism 30 and the motors MG1, MG2 and then output to the ring gear shaft 32a. In the charge/discharge operating mode, the engine 22 is operation-controlled such that power corresponding to a sum of the required power and power required to charge/discharge the battery 50 is output, and the motors MG1, MG2 are drive-controlled such that all or a part of the power output from the engine 22 during charging/discharging of the battery 50 is subjected to torque conversion by the power distribution integration mechanism 30 and the motors MG1, MG2 and the required power is output to the ring gear shaft 32a. In the motor operating mode, the engine 22 is stopped or caused to perform an idle operation, and the motors MG1, MG2 are operation-controlled such that the required power is output to the ring gear shaft 32a from the motor MG2. Here, there is substantially no difference between the control performed in the torque conversion operating mode and the control performed in the charge/discharge operating mode except that in the former, charge/discharge of the battery 50 is not performed, and therefore, in the following description, the two modes will be described together as an engine operating mode.

Figure 2A:
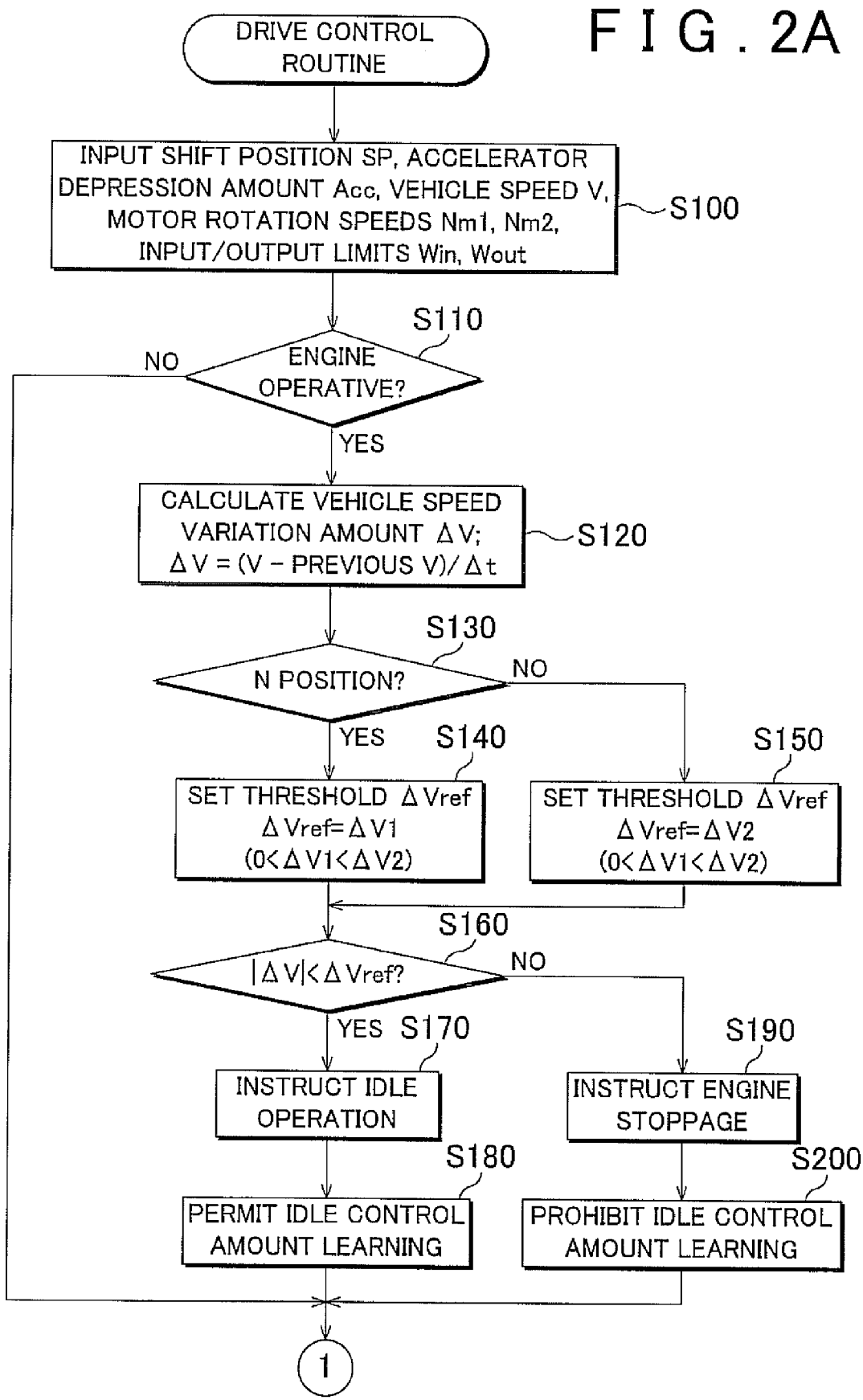
FIGS. 2A and 2B are a flowchart showing an example of a drive control routine executed by a hybrid electronic control unit according to the embodiment.
Figure 2B:
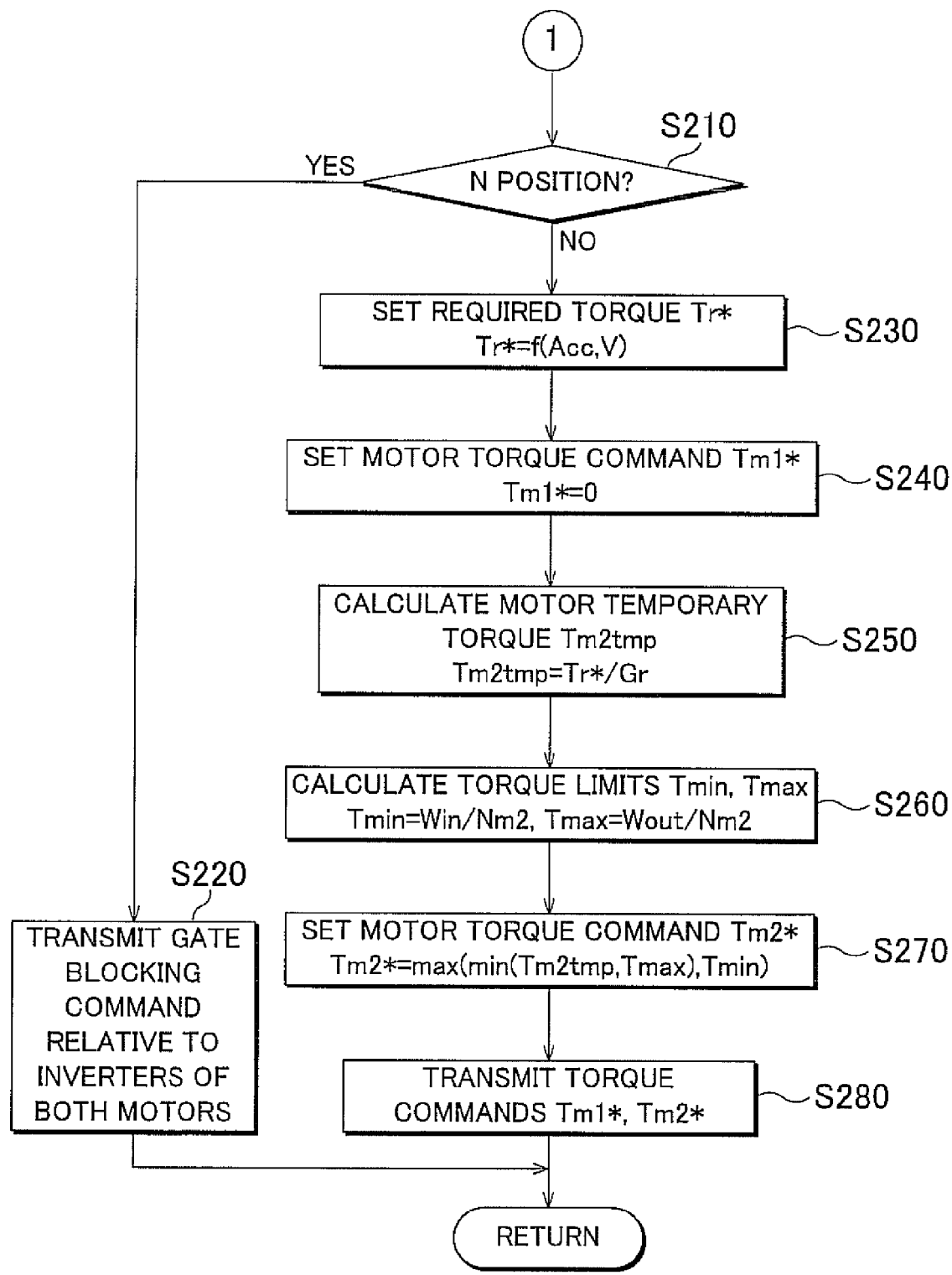

Next, an operation of the hybrid automobile 20 according to this embodiment, constituted in the manner described above, and particularly an operation performed when a predetermined learning condition (for example, a condition according to which the cooling water temperature Tw of the engine 22 has reached or exceeded the predetermined temperature indicating warm-up completion and an idle operation is underway in the engine 22, or the like) is established during a shift from the engine operating mode to the motor operating mode such that the hybrid automobile 20 travels while an idle control amount is learned, will be described. FIGS. 2A and 2B are a flowchart showing an example of a drive control routine executed by the hybrid ECU 70. This routine is executed repeatedly at predetermined time intervals (of several msec, for example) when a condition for shifting from the engine operating mode to the motor operating mode is established. In this embodiment, a shift is performed from the engine operating mode to the motor operating mode when a condition according to which the power to be output from the engine 22 on the basis of the accelerator operation of the driver is smaller than a threshold and the remaining capacity (SOC) of the battery 50 is equal to or greater than a threshold is established, for example.

When the drive control routine is executed, first, the CPU 72 of the hybrid ECU 70 obtains data required in the control such as the accelerator depression amount Acc obtained from the accelerator pedal position sensor 84, the vehicle speed V obtained from the vehicle speed sensor 88, the rotation speeds Nm1, Nm2 of the motors MG1, MG2, and the input/output limits Win, Wout of the battery 50 (step S100). Note that the hybrid ECU 70 receives the rotation speeds Nm1, Nm2 of the motors MG1, MG2, which are calculated on the basis of the rotation positions of the rotors of the motors MG1, MG2 detected by the rotation position detection sensors 43, 44, from the motor ECU 40 through communication. Further, the hybrid ECU 70 receives the input/output limits Win, Wout of the battery 50, which are set on the basis of the battery temperature Tb of the battery 50 and the remaining capacity (SOC) of the battery 50, from the battery ECU 52 through communication.

Once the data have been obtained, a determination is made as to whether or not the engine 22 is operative (step S110). When the engine 22 is operative, a vehicle speed variation amount $\Delta V$ is calculated by dividing a value produced by subtracting vehicle speed (previous V) obtained during execution of the previous routine from the obtained vehicle speed V by an execution interval $\Delta t$ of the routine (step S120), and the input shift position SP is checked (step S130). When the shift position SP is the N position, a positive value $\Delta V1$ is set as a threshold $\Delta Vref$ to be compared to the calculated vehicle speed variation amount $\Delta V$ (step S140). When the shift position SP is a position other than the N position (for example, the D position or the like), a larger value $\Delta V2$ than the value $\Delta V1$ is set as the threshold $\Delta Vref$ (step S150). An absolute value of the vehicle speed variation amount $\Delta V$ is then compared to the set threshold $\Delta Vref$ (step S160). When the absolute value of the vehicle speed variation amount $\Delta V$ is smaller than the threshold $\Delta Vref$, the hybrid ECU 70 transmits a signal instructing the engine 22 to perform an idle operation and a signal permitting learning of the idle control amount to the engine ECU 24 (steps S170, S180). When the absolute value of the vehicle speed variation amount $\Delta V$ equals or exceeds the threshold $\Delta Vref$, on the other hand, the hybrid ECU 70 transmits a signal instructing the engine 22 to stop operating and a signal prohibiting learning of the idle control amount to the engine ECU 24 (steps S190, S200). After receiving the signal instructing the engine 22 to perform an idle operation and the signal permitting learning of the idle control amount, the engine ECU 24 executes idle control amount learning when the engine 22 begins an idle operation and the predetermined learning condition is established. After receiving the signal instructing the engine 22 to stop operating and the signal prohibiting learning of the idle control amount, on the other hand, the engine ECU 24 stops the operation of the engine 22 without executing idle control amount learning. The reason why different values are set as the threshold $\Delta Vref$ depending on whether or not the shift position SP is the N position in step S130 and the reason why learning of the idle control amount is permitted only when the absolute value of the vehicle speed variation amount $\Delta V$ is smaller than the threshold $\Delta Vref$ in step S160 will be described below.

After determining in step S110 that the engine 22 is inoperative or after transmitting the signal permitting or prohibiting idle control amount learning to the engine ECU 24 as described above, the hybrid ECU 70 checks the shift position SP (step S210). When the shift position SP is the N position, the hybrid ECU 70 transmits a gate blocking command relating to the inverters 41, 42 of the motors MG1, MG2 to the motor ECU 40 (step S220), whereupon the routine is terminated. After receiving the gate blocking command relating to the inverters 41, 42, the motor ECU 40 executes gate blocking on the inverters 41, 42 if the inverters 41, 42 have not been subjected to gate blocking.

Figure 3:
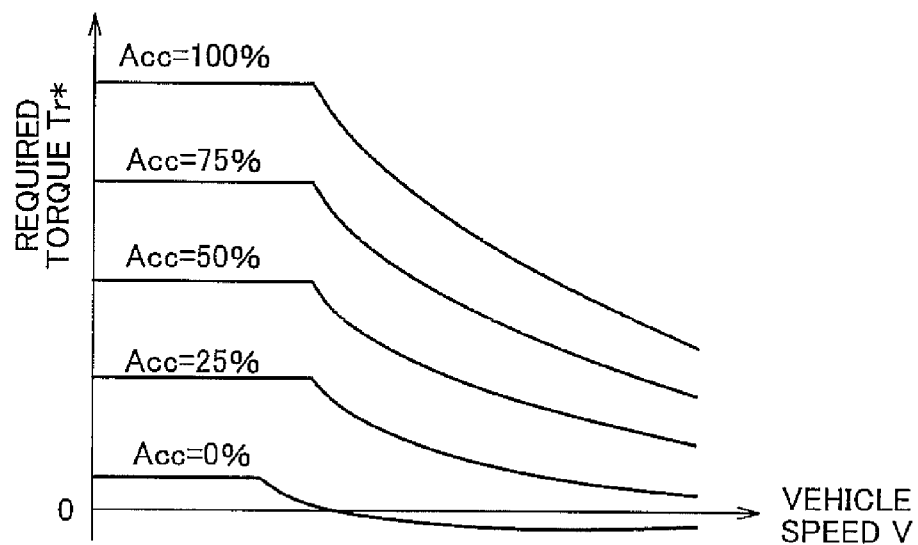
FIG. 3 is an illustrative view showing an example of a required torque setting map.

When the shift position SP is a position other than the N position, the hybrid ECU 70 sets a required torque Tr* to be output to the ring gear shaft 32*a*, which is connected to the drive wheels 63*a*, 63*b*, as a torque required by the vehicle on the basis of the obtained accelerator depression amount Acc and vehicle speed V (step S230). In this embodiment, the ROM 74 stores a required torque setting map in which a relationship between the accelerator depression amount Acc, the vehicle speed V, and the required torque Tr* is determined in advance. When the accelerator depression amount Acc and the vehicle speed V are provided, the corresponding required torque Tr* is calculated from the stored map, and thus the required torque Tr* is set. FIG. 3 shows an example of the required torque setting map.

The hybrid ECU 70 then sets a torque command Tm1* of the motor MG1 at a value of 0 (step S240), sets a value obtained by dividing the required torque Tr* by a gear ratio Gr of the reduction gear 35 as a temporary torque Tm2*tmp*, which is a temporary value of the torque to be output from the motor MG2 (step S250), divides the input/output limits Win, Wout of the battery 50 by the rotation speed Nm2 of the motor MG2 to calculate torque limits Tmin, Tmax of the motor MG2 (step S260), limits the temporary torque Tm2*tmp* by the torque limits Tmin, Tmax to set a torque command Tm2* of the motor MG2 (step S270), and transmits the set torque commands Tm1*, Tm2* to the motor ECU 40 (step S280). The routine is then terminated. Upon reception of the torque commands Tm1*, Tm2*, the motor ECU 40 performs switching control on switching elements of the inverters 41, 42 such that the motor MG1 is driven by the torque command Tm1* and the motor MG2 is driven by the torque command Tm2*. According to this control, the required torque Tr* within the range of the input/output limits Win, Wout of the battery 50 is output to the ring gear shaft 32*a* from the motor MG2 in a state where the operation of the engine 22 is stopped or a state where an idle operation is underway in the engine 22 and learning of the idle control amount is executed, and thus the vehicle is caused to travel.

Figure 4:
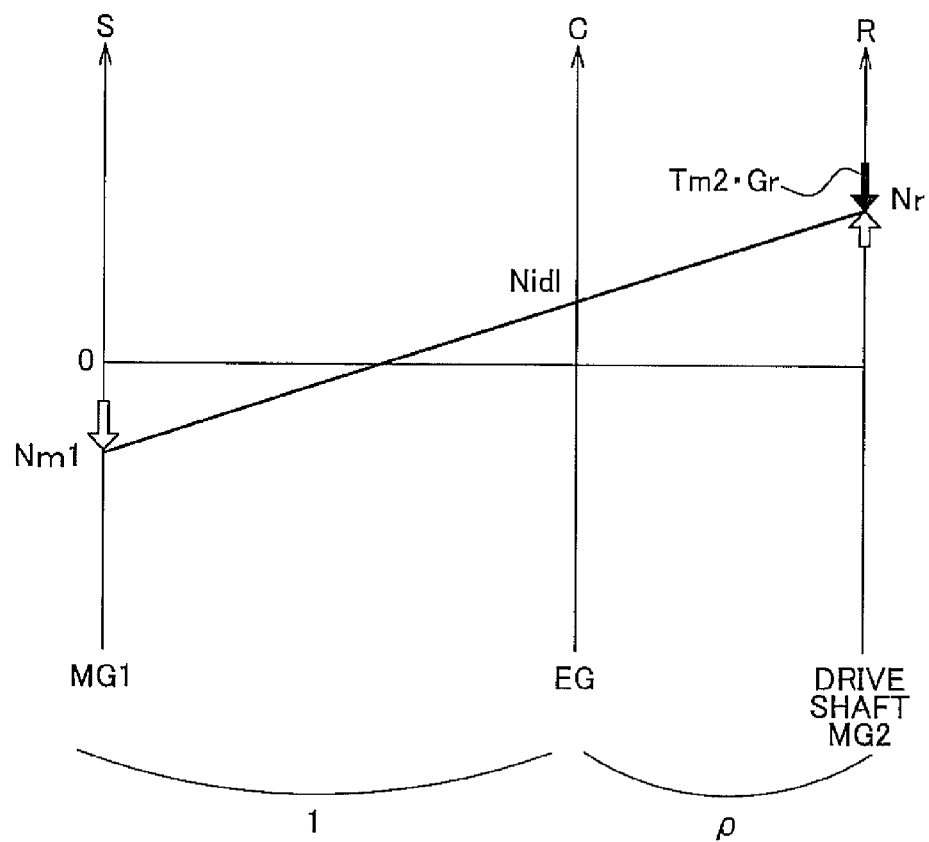
FIG. 4 is an illustrative view showing an example of a collinear graph representing a dynamic relationship between a torque and a rotation speed of a rotary element of a power distribution integration mechanism during travel in an accelerator OFF state while learning of an idle control amount is underway in a motor operating mode.

The reason why different values are set as the threshold ΔVref depending on whether or not the shift position SP is the N position in step S130 and the reason why learning of the idle control amount is permitted only when the absolute value of the vehicle speed variation amount ΔV is smaller than the threshold ΔVref in step S160 will now be described. FIG. 4 shows an example of a collinear graph representing a dynamic relationship between the torque and the rotation speed of a rotary element of the power distribution integration mechanism 30 during travel of the vehicle in an accelerator OFF state while learning of the idle control amount of the engine 22 is underway in the motor operating mode. An S axis on the left of the drawing indicates a rotation speed of the sun gear 31, i.e. the rotation speed Nm1 of the motor MG1. A C axis indicates a rotation speed of the carrier 34, i.e. the engine speed Ne of the engine 22. An R axis indicates a rotation speed Nr of the ring gear 32, which is obtained by dividing the rotation speed Nm2 of the motor MG2 by the gear ratio Gr of the reduction gear 35. A thick arrow on the R axis indicates the torque Tm2 that is output from the motor MG2 and acts on the ring gear shaft 32*a* via the reduction gear 35. For example, when the vehicle is decelerated by taking a foot off the accelerator or the like, leading to variation in the vehicle speed V due to acceleration/deceleration of the vehicle, a torque corresponding to a product of an inertial moment on the sun gear 31 side of the power distribution integration mechanism 30 and a rotation variation amount of the sun gear 31 and a torque corresponding to a product of an inertial moment on the ring gear 32 side of the power distribution integration mechanism 30 and a rotation variation amount of the ring gear 32 act in a direction for inhibiting rotational variation in the sun gear 31 and ring gear 32, and also act on the carrier 34, as shown by outlined arrows on the S axis and the R axis. Accordingly, when the absolute value of the vehicle speed variation amount ΔV increases, the torque that acts on the crankshaft 26 of the engine 22 via the carrier 34 increases. Hence, when the engine ECU 24 learns the idle control amount in this condition, the idle control amount may be learned erroneously. Therefore, idle control amount learning is permitted only when the absolute value of the vehicle speed variation amount ΔV is determined to be smaller than the threshold ΔVref in step S160. Further, when the shift position SP is the N position, the inverters 41, 42 for driving the motors MG1, MG2 are gate-blocked, and therefore, when the motors MG1, MG2 are spun as the vehicle travels, a voltage is generated in the motors MG1, MG2 in a direction for inhibiting rotation of the rotors thereof. A torque corresponding to this counter voltage (counter-electromotive force), which acts on the sun gear 31 and the ring gear 32, acts on the crankshaft 26 of the engine 22 via the carrier 34 in conjunction with, and in the same direction as, the torque corresponding to the vehicle speed variation amount ΔV. Therefore, when the shift position SP is determined in step S130 to be the N position in which the inverters 41, 42 are gate-blocked, the threshold ΔVref is set to be smaller than in the other positions. Hence, the N position value ΔV1 and the other position value ΔV2 for setting the threshold ΔVref serve as upper limit values of ranges in which the idle control amount of the engine 22 is not learned erroneously. Note that ΔV1 and ΔV2 are determined in advance through experiment or the like as values based on the shift position SP.

According to the hybrid automobile 20 of the embodiment described above, when the absolute value of the vehicle speed variation amount ΔV is smaller than the threshold ΔVref, learning of the idle control amount of the engine 22 is permitted, and learning is executed in accordance with establishment of the predetermined learning condition. When the absolute value of the vehicle speed variation amount ΔV equals or exceeds the threshold ΔVref, this learning is prohibited to suppress erroneous learning of the idle control amount. Therefore, the idle control amount can be learned more appropriately. Further, when the shift position SP is the N position, the threshold ΔVref that is compared to the absolute value of the vehicle speed variation amount ΔV is set to be smaller than in other positions, and therefore the idle control amount can be learned even more appropriately.

In the hybrid automobile 20 according to this embodiment, different values ΔV1 and ΔV2 are set as the threshold ΔVref to be compared to the vehicle speed variation amount ΔV depending on whether or not the shift position SP is the N position. However, a predetermined value (for example, the value ΔV1 or the like) may be used as the threshold ΔVref that is compared to the vehicle speed variation amount ΔV, regardless of the shift position SP.

In the hybrid automobile 20 according to this embodiment, the vehicle speed variation amount ΔV is calculated on the basis of the vehicle speed V obtained from the vehicle speed sensor 88 and then compared to the threshold ΔVref. However, a variation amount of the rotation speed Nm2 of the motor MG2 may be calculated and compared with a threshold corresponding to the threshold ΔVref, and when an acceleration sensor for detecting acceleration in the vehicle is provided, the detected acceleration of the vehicle may be compared with the threshold ΔVref instead of the vehicle speed variation amount ΔV.

In the hybrid automobile 20 according to this embodiment, a determination is made as to whether or not the absolute value of the vehicle speed variation amount ΔV is smaller than the threshold ΔVref. In other words, the determination is made using a threshold of an identical magnitude regardless of whether the vehicle speed variation amount ΔV is on a positive side or a negative side. However, as long as a determination is made as to whether or not the vehicle speed variation amount ΔV is within a predetermined range including a value of zero, a determination as to whether or not the vehicle speed variation amount ΔV is smaller than a positive side threshold may be made when the vehicle speed variation amount ΔV is on the positive side, and a determination as to whether or not the vehicle speed variation amount ΔV is larger than a negative side threshold having a different magnitude to the positive side threshold may be made when the vehicle speed variation amount ΔV is on the negative side.

In the hybrid automobile 20 according to this embodiment, control performed during a shift from the engine operating mode to the motor operating mode was described, but the invention may be applied to control performed in any state where an idle operation can be performed in the engine 22.

In the hybrid automobile 20 according to this embodiment, the motor MG2 is attached to the ring gear shaft 32a serving as the drive shaft via the reduction gear 35, but the motor MG2 may be attached to the ring gear shaft 32a directly or via a transmission having two speeds, three speeds, four speeds, or more instead of the reduction gear 35.

Figure 5:
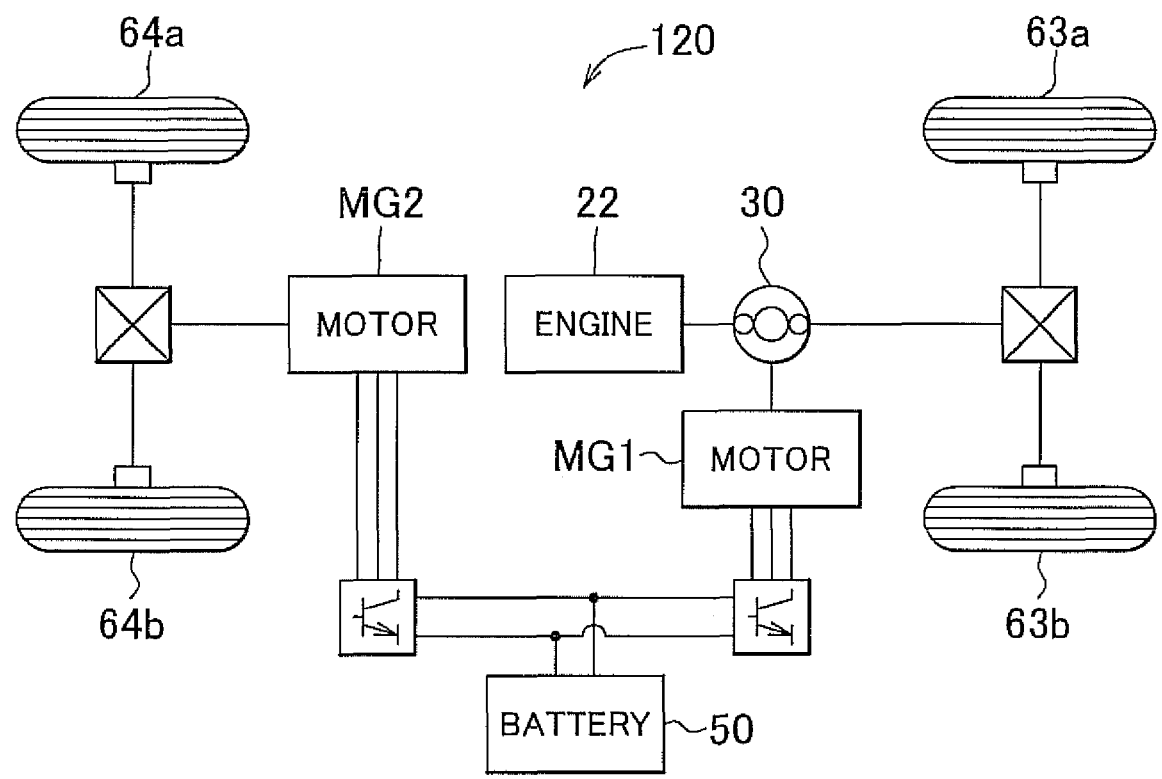
FIG. 5 is a schematic diagram showing the constitution of a hybrid automobile according to a modified example.

In the hybrid automobile 20 according to this embodiment, the power of the motor MG2 is speed-shifted by the reduction gear 35 and then output to the ring gear shaft 32a. As shown in FIG. 5, which shows a hybrid automobile 120 according to a modified example, however, the power of the motor MG2 may be output to an axle (e.g. axle connected to vehicle wheels 64a, 64b in FIG. 5) to the axle other than the axle to which the ring gear shaft 32a is connected (i.e., the axle to which the drive wheels 63a, 63b are connected).

Furthermore, the invention is not limited to a hybrid automobile, and may be applied to a power output apparatus installed in a moving body such as a vehicle other than an automobile, a ship, or an aircraft, or a power output apparatus incorporated into an immobile facility such as a construction facility. The invention may also be applied to a control method for these types of power output apparatuses.

In this embodiment, the engine 22, the motor MG1, the power distribution integration mechanism 30, the motor MG2, and the battery 50 may be seen respectively as an "internal combustion engine", a "generator", a "triaxial power input/output unit", an "electric motor", and a "storage unit" of the invention. Furthermore, in the embodiment, the hybrid ECU 70 that executes the processing of step S230 of the drive control routine shown in FIGS. 2A and 2B, in which the required torque Tr* is set on the basis of the accelerator depression amount Acc and the vehicle speed V, may be seen as a "required driving force setting unit" of the invention. The hybrid ECU 70 that executes the processing of steps S160 to S200 and S240 to S280 in the drive control routine shown in FIGS. 2A and 2B, in which the instruction signal for causing the engine 22 to perform an idle operation and the signal permitting learning of the idle control amount are transmitted to the engine ECU 24 when the absolute value of the vehicle speed variation amount ΔV is smaller than the threshold ΔVref based on the shift position SP and the instruction signal for stopping the operation of the engine 22 and the signal prohibiting learning of the idle control amount are transmitted to the engine ECU 24 when the absolute value of the vehicle speed variation amount ΔV equals or exceeds the threshold ΔVref, and in which the zero value torque command Tm1* of the motor MG1 and the torque command Tm2* of the motor MG2, which is set such that the required torque Tr* is output to the ring gear shaft 32a within the range of the input/output limits Win, Wout of the battery 50 are transmitted to the motor ECU 40, the engine ECU 24 for controlling the engine 22 such that idle control amount learning is executed in accordance with establishment of the predetermined learning condition within the permitted range based on the received signals, and the motor ECU 40 for controlling the motors MG1, MG2 on the basis of the torque commands Tm1*, Tm2*, may be seen together as a "control unit" of the invention. Further, the inverter 41 and the inverter 42 may be seen as a "generator inverter circuit" and an "electric motor inverter circuit" of the invention, respectively.

Here, the "internal combustion engine" is not limited to an internal combustion engine that outputs power using a hydrocarbon-based fuel such as gasoline or light oil, and may be any type of internal combustion engine, such as a hydrogen engine. The "electric motor" is not limited to the motor MG1, which is constituted by a synchronous generator motor, and may be any type of electric motor that inputs and outputs power, such as an induction motor. The "triaxial power input/output unit" is not limited to the power distribution integration mechanism 30 described above, and may be any device that is connected to three shafts, namely a drive shaft, an output shaft of an internal combustion engine, and a rotary shaft of an electric motor, so as to output power input into any two of the three shafts into a remaining shaft of the three shafts and output power input into any one of the three shafts into two remaining shafts of the three shafts, such as a device that employs a double pinion type planetary gear mechanism, a device that is connected to four or more shafts through a combination of multiple planetary gear mechanisms, or a device that exhibits a different differential action to a planetary gear, such as a differential gear. The "generator" is not limited to the motor MG2, which is constituted by a synchronous generator motor, and may be any type of electric motor that inputs and outputs power to and from a drive shaft, such as an induction motor. The "storage unit" is not limited to the battery 50 serving as a secondary battery, and may be any device that exchanges power with a generator and an electric motor, such as a capacitor. The "required driving force setting unit" is not limited to a device that sets the required torque Tr* on the basis of the accelerator depression amount Acc and the vehicle speed V, and may be any device that sets a required driving force required by a drive shaft, such as a device that sets the required torque on the basis of the accelerator depression amount Acc alone or a device in which a travel route is preset such that the required torque is set on the basis of a travel position on the travel route. The "control unit" is not limited to a combination of the hybrid ECU 70, the engine ECU 24, and the motor ECU 40, and may be constituted by a single electronic control unit. Further, the "control unit" is not limited to a device that controls the engine 22 such that idle control amount learning is executed in accordance with establishment of the predetermined learning condition on the basis of the instruction signal for causing the engine 22 to perform an idle operation and the signal permitting learning of the idle control amount when the absolute value of the vehicle speed variation amount ΔV is smaller than the threshold ΔVref based on the shift position SP, controls the engine 22 such that the operation of the engine 22 is stopped without executing idle control amount learning on the basis of the instruction signal for stopping the operation of the engine 22 and the signal prohibiting learning of the idle control amount when the absolute value of the vehicle speed variation amount ΔV equals or exceeds the threshold ΔVref, and controls the motors MG1, MG2 on the basis of the torque command Tm1* of the motor MG1, which is set to a value of zero, and the torque command Tm2* of the motor MG2, which is set such that the required torque Tr* is output to the ring gear shaft 32a within the range of the input/output limits Win, Wout of the battery 50, and may be any device that controls an internal combustion engine, a generator, and an electric motor such that when a rotation variation amount of a drive shaft is within a predetermined range including a value of zero, a set required driving force is output to the drive shaft while executing idle control amount learning, in which an idle control amount serving as a control amount obtained during an idle operation of the internal combustion engine is learned in accordance with the establishment of a predetermined learning condition, and controls the internal combustion engine, the generator, and the electric motor such that when the rotation variation amount of the drive shaft is not within the predetermined range, the set required driving force is output to the drive shaft without executing idle control amount learning. Further, the "generator inverter circuit" is not limited to the inverter 41, and may be any device that is electrically connected to a generator and a storage unit in order to drive the generator, and the "electric motor inverter circuit" is not limited to the inverter 42, and may be any device that is electrically connected to an electric motor and a storage unit in order to drive the electric motor.

While some embodiments of the invention have been illustrated above, it is to be understood that the invention is not limited to details of the illustrated embodiments, and may be embodied with various changes, modifications, or improvements, which may occur to those skilled in the art, without departing from the spirit and scope of the invention.

The invention may be used in the power output apparatus and vehicle manufacturing industries, and so on.

What is claimed is:

1. A power output apparatus comprising:
   an internal combustion engine;
   a generator for inputting and outputting power;
   a triaxial power input/output unit that is mechanically connected to three shafts, including a drive shaft, an output shaft of the internal combustion engine, and a rotary shaft of the generator, in order to output power input into any two of the three shafts into a remaining shaft of the three shafts and output power input into any one of the three shafts into two remaining shafts of the three shafts;
   an electric motor for inputting and outputting power to and from the drive shaft;
   a storage unit that exchanges power with the generator and the electric motor;
   a required driving force setting unit that sets a required driving force required by the drive shaft; and
   a control unit that controls the internal combustion engine, the generator, and the electric motor such that the set required driving force is output to the drive shaft, that learns an idle control amount, which is a control amount obtained during an idle operation of the internal combustion engine, in accordance with establishment of a predetermined learning condition when a rotation variation amount of the drive shaft is within a predetermined range including a value of zero, and that does not learn the idle control amount when the rotation variation amount of the drive shaft is not within the predetermined range.

2. A vehicle comprising the power output apparatus according to claim 1, wherein an axle is connected to the drive shaft.

3. The vehicle according to claim 2, further comprising:
   a generator inverter circuit that is electrically connected to the generator and the storage unit in order to drive the generator; and
   an electric motor inverter circuit that is electrically connected to the electric motor and the storage unit in order to drive the electric motor,
   wherein the control unit performs gate blocking on the generator inverter circuit and the electric motor inverter circuit and sets a first range as the predetermined range when a shift position is a neutral position, and sets a second range, which is larger than the first range, as the predetermined range without performing gate blocking on the generator inverter circuit and the electric motor inverter circuit when the shift position is not the neutral position.

4. The vehicle according to claim 2, wherein the control unit uses a variation amount of a vehicle speed as the rotation variation amount of the drive shaft, and uses a predetermined vehicle speed range including a value of zero as the predetermined range.

5. The vehicle according to claim 2, wherein the control unit determines that the predetermined learning condition is established when a cooling water temperature of the internal combustion engine reaches or exceeds a predetermined temperature indicating warm-up completion and an idle operation is underway in the internal combustion engine.

6. The vehicle according to claim 2, wherein the control unit stops the internal combustion engine when the rotation variation amount of the drive shaft is not within the predetermined range.

7. The vehicle according to claim 2, wherein the vehicle travels in one of an engine operating mode, in which power is output to the drive shaft from the internal combustion engine, and a motor operating mode, in which power is output to the drive shaft from the electric motor and power is not output to the drive shaft from the internal combustion engine, and
   the control unit determines whether or not the rotation variation amount of the drive shaft is within the predetermined range when the vehicle shifts from the engine operating mode to the motor operating mode.

8. The vehicle according to claim 7, wherein the vehicle shifts from the engine operating mode to the motor operating mode when the control unit determines that the power to be output to the drive shaft from the internal combustion engine is smaller than a threshold and a remaining capacity of the storage unit equals or exceeds a threshold.

9. A control method for a power output apparatus including an internal combustion engine, a generator for inputting and outputting power, a triaxial power input/output unit that is mechanically connected to three shafts, including a drive shaft, an output shaft of the internal combustion engine, and a rotary shaft of the generator, in order to output power input into any two of the three shafts into a remaining shaft of the three shafts and output power input into any one of the three shafts into two remaining shafts of the three shafts, an electric motor for inputting and outputting power to and from the drive shaft, and a storage unit that exchanges power with the generator and the electric motor, the method comprising:
   learning an idle control amount, which is a control amount obtained during an idle operation of the internal combustion engine, in accordance with establishment of a predetermined learning condition and controlling the internal combustion engine, the generator, and the electric motor such that a required driving force required by the drive shaft is output to the drive shaft when a rotation variation amount of the drive shaft is within a predetermined range including a value of zero, and controlling the internal combustion engine, the generator, and the electric motor such that the required driving force is output to the drive shaft without learning the idle control amount when the rotation variation amount of the drive shaft is not within the predetermined range.

10. The control method according to claim 9, further comprising:

detecting a shift position;

performing gate blocking on a generator inverter circuit that is electrically connected to the generator and the storage unit in order to drive the generator and an electric motor inverter circuit that is electrically connected to the electric motor and the storage unit in order to drive the electric motor, and setting a first range as the predetermined range when the detected shift position is a neutral position; and setting a second range, which is larger than the first range, as the predetermined range without performing gate blocking on the generator inverter circuit and the electric motor inverter circuit when the detected shift position is not the neutral position.

11. The control method according to claim 9, further comprising:

stopping the internal combustion engine when the rotation variation amount of the drive shaft is not within the predetermined range.

* * * * *